(12) United States Patent
Trinko

(10) Patent No.: US 9,933,324 B2
(45) Date of Patent: Apr. 3, 2018

(54) SYSTEM FOR FIELD MEASUREMENT OF CENTER OF GRAVITY

(71) Applicant: The Trinko Group, LLC, Menasha, WI (US)

(72) Inventor: Dominic Trinko, LaCrosse, WI (US)

( * ) Notice: Subject to any disclaimer, the term of this patent is extended or adjusted under 35 U.S.C. 154(b) by 231 days.

(21) Appl. No.: 14/943,482

(22) Filed: Nov. 17, 2015

(65) Prior Publication Data

US 2016/0138995 A1    May 19, 2016

Related U.S. Application Data

(60) Provisional application No. 62/081,345, filed on Nov. 18, 2014.

(51) Int. Cl.
*G01M 1/12* (2006.01)
*G01G 23/36* (2006.01)

(52) U.S. Cl.
CPC ............ *G01M 1/122* (2013.01); *G01G 23/36* (2013.01)

(58) Field of Classification Search
CPC ................................ G01M 1/122; G01G 23/36
See application file for complete search history.

(56) References Cited

U.S. PATENT DOCUMENTS

| | | | |
|---|---|---|---|
| 2013/0146371 A1* | 6/2013 | Shih ................... | G01G 19/445 177/144 |
| 2016/0202111 A1* | 7/2016 | Fahey ................. | B65D 90/143 177/141 |

* cited by examiner

*Primary Examiner* — Paul West
(74) *Attorney, Agent, or Firm* — Boyle Fredrickson, S.C.

(57) ABSTRACT

A platformless center of mass measurement system employs independently positionable load cell units whose locations can be identified and combined with load cell measurements to compute a center of mass for arbitrarily shaped large structures without the need for precise or predetermined locating of the load cell units on a platform or the like.

15 Claims, 3 Drawing Sheets

SYSTEM FOR FIELD MEASUREMENT OF CENTER OF GRAVITY

CROSS REFERENCE TO RELATED APPLICATION

This application claims the benefit of U.S. provisional application 62/081,345 filed Nov. 18, 2014 and hereby incorporated by reference.

BACKGROUND OF THE INVENTION

The present invention relates to an electronic apparatus for measuring center of gravity (center of mass) and in particular an apparatus for this purpose suitable for use in the field.

The measurement of center of gravity of large structures or mechanisms is often desired, for example, in determining the stability of the structure or mechanism particularly under different configurations or with movement, or determining the appropriate lifting point the structure or mechanism. Generally, it is understood that maintaining the center of gravity above the support point of the structure is required for stability of the structure and that hoisting a structure from a point above the center of gravity provides improved balance and reduced problems of rotation.

Generally, it is understood that a two-dimensional center of gravity measurement may be made by supporting the structure or mechanism on one or more weight measuring sensors such as load cells. The measured wave at each sensor, and the precise relative location of the sensors with respect to the supported structure together define "moments" from which center of gravity may be determined.

This technique may be implemented using a platform on which the structure or mechanism may be placed. The platform may incorporate precisely located weight sensors and appropriate processing equipment to calculate center of gravity.

Such center of gravity measuring techniques are relatively difficult for structures or mechanisms that cannot be easily moved or placed on a platform.

SUMMARY OF THE INVENTION

The present invention provides a system for measuring center of gravity of large structures or mechanisms employing multiple, freely locatable sensor supports that may be installed to measure the mechanism or structure in place. Importantly, system automatically locates the position of each installed sensor after installation to calculate the necessary moments and center of gravity. The result is a highly portable system that may measure center of gravity on arbitrarily large structures or machines in the field and away from special ramps or measuring systems.

These particular objects and advantages may apply to only some embodiments falling within the claims and thus do not define the scope of the invention.

DETAILED DESCRIPTION OF THE PREFERRED EMBODIMENT

Figure 1:
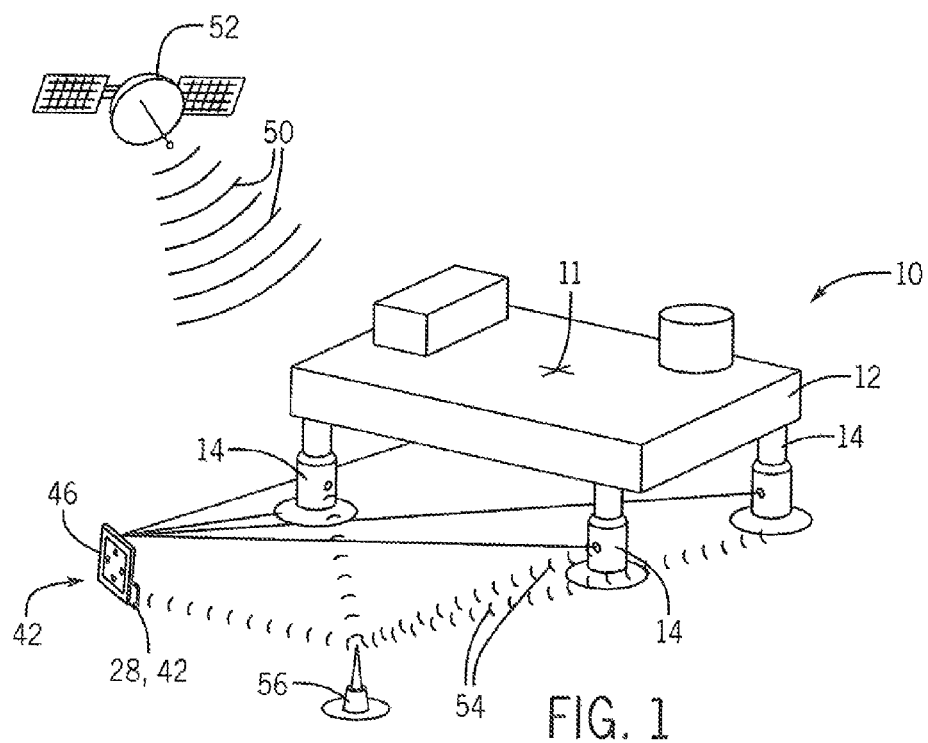
FIG. 1 is a simplified perspective view of multiple sensor stands of the present invention positioned to measure the center of gravity of a structure and showing a base station providing a central reference point used in one embodiment of the invention and the wireless processing system for calculating the center of mass.
Figure 2:
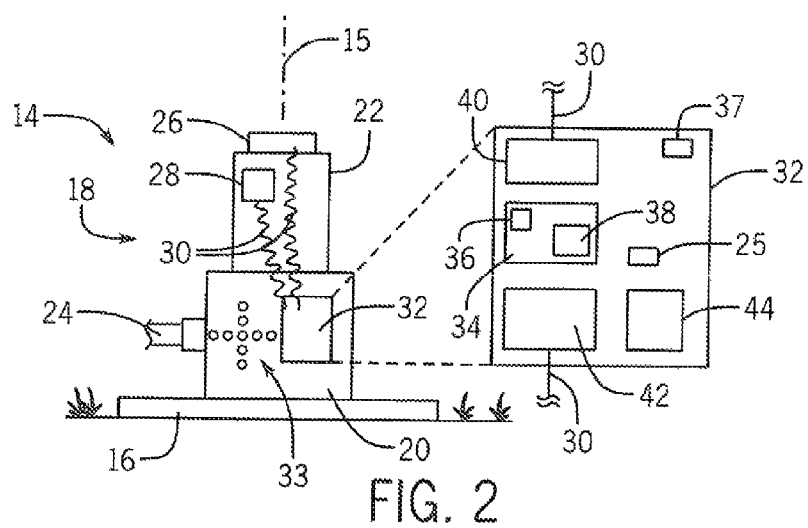
FIG. 2 is a detailed diagram of one sensor stand showing a functional block diagram of its associated electronics.

Referring to FIGS. 1 and 2, a center of gravity calculating system 10 per one embodiment of the present invention may work to determine an areal center of gravity 11 of a large structure or mechanism providing an object to be measured 12. In that measurement, object to be measured 12 is supported at arbitrary points on multiple (at least three) sensor stands 14. Generally, the location of the sensor stands 14 is largely arbitrary provided that the object to be measured 12 may be stably supported within a load range of the sensor stand 14. Specifically, each sensor stand 14 may be positioned independent of the location of the other sensor stands 14. An arbitrary number of sensor stands 14 may be employed.

Each sensor stands 14 may include a base pad 16 for supporting the sensor stand 14 in an arbitrary field location. Desirably the base pad 16 is large enough to prevent substantial downward movement of the sensor stand 14 under load, for example, when the sensor stand 14 is supported on earth or pavement given the anticipated weight of the object to be measured 12 and the number of sensor stands 14. In one embodiment, the base pad 16 may be a disk, for example of quarter inch steel having a diameter of at least one foot. The base pad 16 further is sized to resist torque on the sensor stand 14 caused by expected imbalances of the object to be measured 12 as it is raised on the sensor stands 14.

Extending up from the base pad 16 may be a sensor column 18 which may, in one embodiment, be implemented in the form of a hydraulic jack having a base portion 20 and a telescoping piston portion 22 that may be extended from the base portion under great mechanical advantage by mechanical movement of an operator 24, in this case, a pump operator. Alternatively a screw-type jack may be used, in which case the operator is a shaft allowing rotation of the jackscrew. Movement of the operator 24 elevates or lowers the load cell 26 with respect to the base pad 16 and resists subsequent change in that position by forces applied to the load cell 26 up to the capacity of the load cell 26. The base portion 20 is attached to the base pad 16 and the upper surface of the telescoping piston portion 22 holds a load cell 26 that may contact the under surface of the object to be measured 12.

Figure 6:
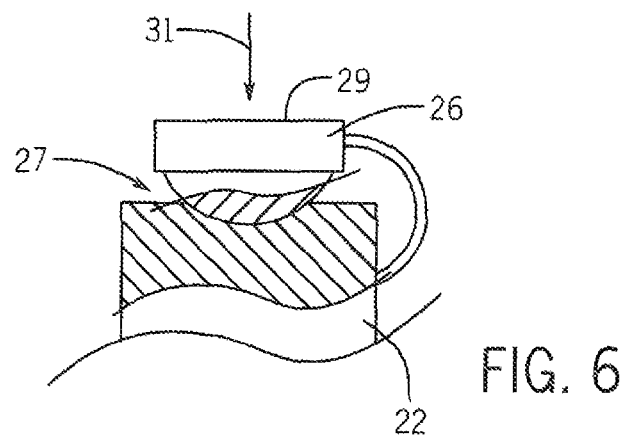
FIG. 6 is a cross-sectional view through the upper end of the sensor stand showing a swivel Mount for the load cell.

Referring momentarily to FIG. 6, the load cell 26 may be attached to the upper surface of the telescoping piston portion 22 through a swivel joint 27 that allows a top face 29 of a load cell 26 to swivel so that its surface is generally normal to a load vector 31 applied to the load cell 26. Alternatively, the load cell 26 may be rigidly attached to the telescoping piston portion 22. Generally, it is contemplated that the load cell 26 will be able to provide measurements of no less than 500 pounds and will typically have a load capacity of at least two tons.

Also attached to the telescoping piston portion 22, at a known location with respect to the load cell 26, is a location identifier 28 which allows determination of the location of each sensor stand 14. The location identifier 28 allows the location of the load stand 14 by any of a variety of mechanisms including GPS, optical and ultrasonic techniques.

The load cell 26 and in some cases the location identifier 28 may communicate, for example, by flexible conductors 30 with a processing unit 32. The processing unit 32 generally includes a microcontroller 34 having one or more processors 36 and a memory 38 holding a stored program executable by the processors 36 whose operation will be described below. The processing unit 32 may communicate with load cell processing circuitry 40 of a type known in the art which receive signals from the load cell 26 provides to the processing unit 32 a force measurement from the load cell 26 being a general downward force along the axis of the sensor column 18. The processing unit 32 may also communicate with an output display 33 visible to a user as will be discussed below.

The microcontroller 34 may also communicate with remote location determining circuitry 42, for example, communicating via conductor 30 with the location identifier 28, Generally, the location determining circuitry 42 may be distributed among the tablet computer 46 and the processing unit 32. In one embodiment, the location identifier 28 may be a GPS/Real-Time Kinematic (RTK) antenna and the location determining circuitry 42 will be the circuitry associated with this location technique. The microcontroller 34 may also communicate with a wireless data circuit 44 such as a Bluetooth LE transmitter/receiver or standard Wi-Fi transceiver of types known in the art. The microcontroller 34 may also communicate with a three axis accelerometer 25 or other tilt measuring device indicating an angle of an axis 15 generally normal to the upper face of the load cell 26 and extending between the load cell 26 and the base pad 16, with respect to gravity.

The wireless data circuit 44 permits communication with a remote computer/human machine interface, for example, a tablet computer 46 or the like. The wireless data circuit 44 in other embodiments may also provide for data communication between the sensor stands 14. As is understood in the art, the tablet computer 46 may include a battery operated computer system having at least one processor as well as memory holding with a stored program executable by the processor. The tablet computer 46 may also provide for a touchscreen surface providing an interface to the user as will be understood in the art and various radio transceivers including Bluetooth, Wi-Fi, and GPS.

The GPS/RTK antenna of location identifier 28 may receive GPS signals 50 from one or more GPS satellites 52 and a carrier wave signal 54 from a stationary base station 56, the latter also part of the center of gravity calculating system 10. As will be understood in the art, the GPS signal 50 and the carrier wave signal 54 from the base station 56 combine to allow each of the sensor stands 14 to accurately determine the location of the location identifier 28 (and hence by reference the load cell 26). While standard civilian. GPS provides accuracy of approximately 3 meters, inadequate for this purpose, GPS RTK using carrier phase tracking can provide accuracy on the order of several millimeters relative to the base station 56. This information plus the force reading from the load cell 26 may be transmitted via the wireless data circuit 44 to the tablet computer 46 for calculation of center of gravity 11 independent of the install positions of the sensor stands 14. Alternatively the signal from the base station 56 may be sent directly to the tablet computer 46 to provide this accuracy enhancing calculation.

Each of the components of the processing unit 32 may be powered by a battery 37 for complete portability. Ideally each of the sensor stands 14 may be easily moved by a single individual and installed, possibly by the same individual holding and using the tablet computer 46. Ideally, the sensor stands 14 may weigh less than 100 pounds and desirably less than 50 pounds.

Figure 3:
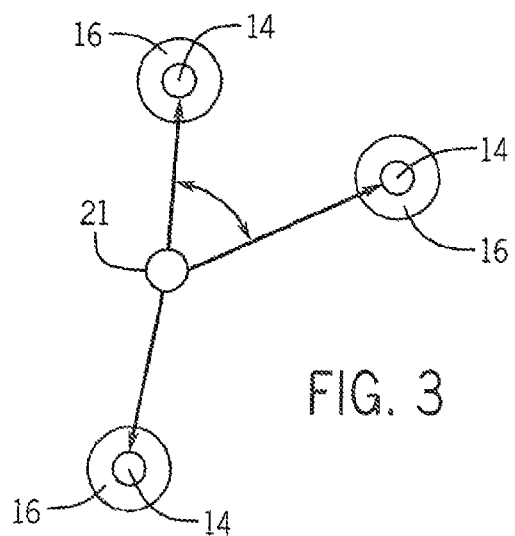
FIG. 3 is a top plan view of the sensor stands located using an optical system.

Referring now to FIG. 3, as an alternative to GPS or for use in augmenting GPS, each sensor stand 14 may provide an optical fiducial, for example, a cube corner or other reflector that allows laser position identification using a central optical rangefinder 21 that may determine range and bearing for each of the sensor stands 14 with respect to a known position of the optical rangefinder 21 determined, for example, using GPS. In this case, the optical rangefinder 21 may use a conventional laser rangefinder as is used in surveying techniques for high accuracy location of the sensor stands 14. Alternatively, the optical rangefinder 21 may be a camera system, for example, identifying retro reflectors or fiducial marks on each of the sensor stands 14 and determining their location by trilateralization.

Figure 4:
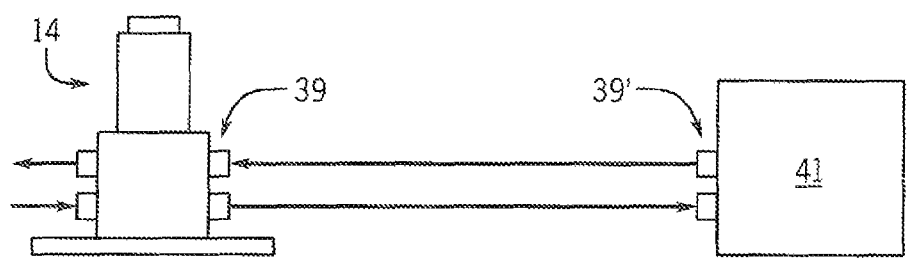
FIG. 4 is a side elevational view of one sensor stand at base station used for ultrasonic location of the sensor stands.

Referring now to FIG. 4, as an alternative to GPS or use for augmenting GPS, each sensor stand 14 may provide for an ultrasonic transducer array 39 having an ultrasonic transducers and receivers at various locations around the base portion 20. This ultrasonic transducer array 39 may communicate with a corresponding array 39 on a beacon 41 having a known location, for example, determined by GPS of an internal GPS transceiver system. An angle and distance of the beacon 41 from each of the sensor stands 14 may be determined, for example, by a round-trip travel of an ultrasonic signal between the sensor stands 14 and the beacon 41 and an angle of that signal determined, for example, by phase shift between the received ultrasonic signal from the arrays 39. Alternatively, each of the sensor stands 14 and the beacon 41 may simply calculate relative separation distances and a mesh discovered that triangulates any two specific locations.

In operation, each sensor stand 14 may be placed beneath a load bearing surface of the object to be measured 12 and the operator 24 activated either manually or by a battery pump system controllable from the tablet computer 46, to raise the telescoping piston portion 22 to begin supporting the object to be measured 12. During this time signals from the load cell 26 may be monitored to prevent exceeding the capacity of the sensor stand 14 and to provide an even load sharing among the sensor stands 14. For this purpose, the tablet computer 46 may monitor a load signal from each sensor stand 14 and provide information to be displayed on display 33 indicating whether additional height should be provided to increase the load on the given load cell 26 or the height should be reduced to relieve load from that load cell 26.

Additional sensor stands 14 may be installed with a similar operation and during this time the tablet computer 46 may provide guidance to the operator to balance the load appropriately among sensor stands 14 and to level the object to be measured 12 into its attitude at which the center of gravity 11 is to be determined. Often this will mean a leveling of the height of each load cell 26 which may be determined from the location determining circuitry 42 provided to the user of the tablet computer 42.

Figure 5:
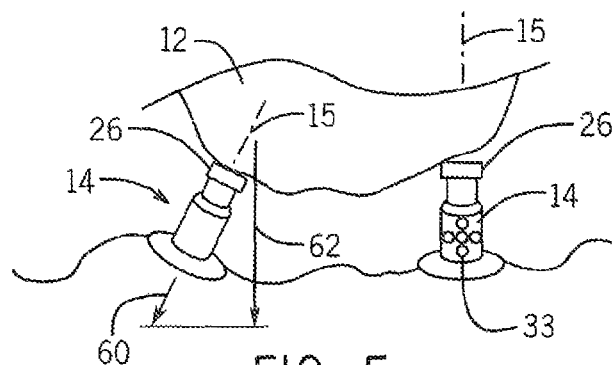
FIG. 5 is a fragmentary elevational view of two sensor stands supporting an object to be measured showing corrections for skew and tilt.

Referring now to FIG. 5, the load signal transmitted to the tablet computer 46 may provide a measurement of the load vector 60 applied along axis 15 together with an indication of the gravitational vector 62 such as may be used to determine a weight at the point of contact between the sensor stand 14 and an object 12 being weighed. The load cell 26 may provide for three orthogonal axes of load measurement which may also be provided to the tablet computer 46 or used internally, for example, to activate the display 33 to instruct the user to adjust the sensor stand 14 to receive a force directly along axis 15 or alternatively to calculate a more complete load vector without concern about skew of the load force with respect to the axis 15 simply by making a vector sum of each of the load measurements along three different axes.

Once the sensor stands 14 are position to fully support the object to be measured 12, a center of gravity calculation may be performed by establishing moments between the base station 56 and each of the sensor stands 14 and combining those moments to deduce a center gravity 11 according to calculations well known in the art.

The tablet computers 46 may also provide for a location system (including location identifier 28 and location determining circuitry 42) enabling the tablet computer 46 to be moved to the location of the center gravity 11 with appropriate visual feedback displays on the tablet computer 42 (for example arrows and distance measurements) allowing the operator to quickly locate center of gravity 11 and to mark it or to align other structures such as a hoist with that center of gravity.

While the invention contemplates the use of GPS RTK in one embodiment, it will be appreciated that other methods of automatic location of the sensor stands 14 may be used including, for example, ultrasonic range finding. In such an ultrasonic system, each sensor stand 14, one of the time may simultaneously transmit an ultrasonic pulse and radio signal pulse to determine an acoustic delay between the given sensor stand 14 and each of the other sensor stands 14 receiving those two pulses. Repeating this process for each sensor stand 14 provides a geometric network that uniquely identifies the relative location of each sensor stand 14 relative to the others.

Alternatively, the base station 56 may be replaced with a laser rangefinder system locating each of the sensor stands 14 by ranging imaging markers (such as corner cube retro reflectors) operating as the location sensors 28. Here angle and range establish the relative locations of each sensor stand 14. Alternatively laser range finding may be performed at multiple locations of the laser rangefinder or time of flight measurements.

An image-based system may also be employed where video images of unique markers forming location sensors 28 on each of the sensor stands 14 (for example, taken with a camera incorporated into the tablet computer 46) may be made of different angles of the camera to determine the location of the sensor stands 14 by triangulation. The multiple camera angles may be precisely located using the same triangulation method in which pre-positioned camera markers (for example supporting tripods) are pre-positioned and located visually in the same process. It will be appreciated that in some of these embodiments the location determining circuitry 42 may be positioned outside of the sensor stands 14.

It will be understood that the present invention may not only determined center of gravity 11 but may also make total weight measurements of the object to be measured 12 by summing together the values from each load cell 26. In addition the system may be used for load balancing measurements in which movable elements of the object to be measured 12 are adjusted to position the center gravity in a particular location. This may be done interactively by seeing how the center of gravity 11 moves during adjustment of the movable elements. The tablet computer 46 may output a center gravity 11 with absolute location of the center of gravity as well as the time and date of the measurement.

Although wireless communication is preferred for communication between the various components it will be appreciated that cabling may also be employed.

Figure 7:
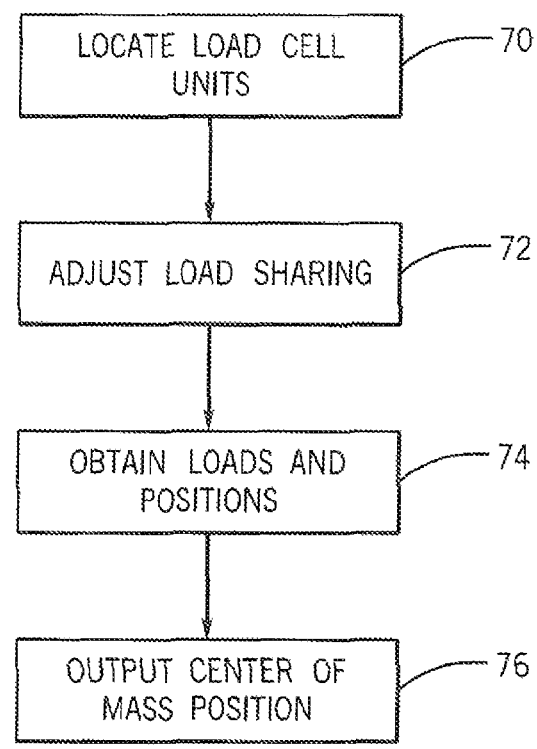
FIG. 7 is a flowchart of a program executed on one or more of the electronic computers of the present invention.

Referring now to FIG. 7, a method of using the invention as indicated by process block 70 begins with a location of the sensor stands 14 on the ground to support the object to be weighed 12. In cases where the sensor stands 14 have been leveled and then calibrated, this step checks to see if the sensor stand has been moved since that calibration. If so the operator may be notified to provide new calibration if desired. At process block 72, the sensor stands 14 are adjusted to improve their load sharing and positioning as discussed above.

At process block 74, load values from each sensor stand 14 are obtained together with their positions either directly from the sensor stands 14 or indirectly using beacons 21, 41 and the like as have been discussed. At this point, the altitude and location of the sensor stands 14 may be determined and the weight adjusted according to known changes in the gravitational constant with altitude and location.

At process block 76 an output may be generated that is human readable indicating the center of mass and its absolute position. The center of mass value may be used, for example, to allow the tablet computer 46 to be maneuvered to the position of the center of mass to allow its marking, using the same positioning techniques used to identify the position of the sensor stands 14 on the tablet computer 46. Process block 76 may include an error handling routine in situations where the present system is used primarily for weighing objects. In these cases, the tablet computer 42, for example, may receive an indication as to whether the weighed object has changed. If not, the weight is obtained by combining the weight values of each of the sensor stands 14 per a typical scale system and also computing the center of gravity. If the center of gravity has changed by a predetermined amount (for example, compared against historical values) for certain weighed objects that tend to sustain a constant center of gravity (for example, tanks silos etc., failure of one load cell 26 may be imputed from an extreme center of gravity change. In this case, a previous center of gravity calculation may be used to extrapolate the weight value for the failed load cell by first identifying the failed load cell, for example, from historical data and then solving for the weight value of the failed load cell using the center of gravity value from a previous measurement. This would allow avoiding scrapping or re-weighing materials in the event of a load cell failure.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

I claim:

1. A center of gravity measurement system comprising:
 a center of mass calculator;
 at least three load cell units communicating with the center of mass calculator, the load cell units being independently positionable in separation from the other load cell units to support a supported structure to be measured, and each comprising:
 (a) a base pad size for support against a generally horizontal surface;
 (b) a jack supported on the base pad and extending upward there from by an adjustable height;
 (c) a load cell supported on the jack and providing an upwardly exposed weighing surface to provide an electrical signal indicating a load placed on the weighing surface; and
 (d) a position identifier identifying a position of each of the load cell units with respect to the other load cell units to communicate the position of each of the load cell units to the center of mass calculator;
 wherein the center of mass calculator receives electrical signals indicating a load from the at least three load cell units and a position of the load cells of the at least three load cell units to calculate a center of mass of the supported structure on the at least three load cell units.

2. The center of gravity measurement system of claim 1 further including wireless transceivers on the load cell units and the center of mass calculator for transmitting and receiving electrical signals indicating a load.

3. The center of gravity measurement system of claim 1 wherein the position identifier is an acoustic fiducial allowing acoustic identification of the position of each load cell.

4. The center of gravity measurement system of claim 1 wherein the position identifier is an optical fiducial allowing optical identification of the position of each load cell.

5. The center of gravity measurement system of claim 1 wherein the load cells further include tilt sensors for transmitting tilt information to the center of mass calculator for modifying the electrical signals indicating a load based on a vector of gravity with respect to an axis between the load cell and base pad.

6. The center of gravity measurement system of claim 1 further including wherein the center of mass calculator corrects the electrical signals indicating a load according to predetermined gravitational constant at a location of the load cell.

7. The center of gravity measurement system of claim 1 wherein the electrical signal from the load cell provides for load vectors along three orthogonal axes.

8. The center of gravity measurement system of claim 1 wherein the jack is selected from mechanisms of a hydraulic jack and a screw jack.

9. The center of gravity measurement system of claim 1 wherein the load cell units provide an indicator to a user indicating an amount of elevation of the jack.

10. The center of gravity measurement system of claim 1 wherein center of mass calculator uses the position of the load cells to provide a warning to a user that a load cell has moved since calibration.

11. A center of gravity measurement system comprising:
 a center of mass calculator;
 at least three load cell units communicating with the center of mass calculator each comprising:
 (a) a base pad size for support against a generally horizontal surface;
 (b) a jack supported on the base pad and extending upward there from by an adjustable height;
 (c) a load cell supported on the jack and providing an upwardly exposed weighing surface to provide an electrical signal indicating a load placed on the weighing surface; and
 (d) a position identifier identifying a position of the load cell;
 wherein the center of mass calculator receives electrical signals indicating a load from the at least three load cell units and a position of the load cells of the at least three load cell units to calculate a center of mass of a supported structure on the at least three load cell units;
 wherein the position identifier is a GPS receiver receiving GPS signals for identifying the position of the load cell.

12. The center of gravity measurement system of claim 11 wherein the position data transmitted to the center of mass calculator is combined with position data from a known stationary reference to determine all the position of the load cell unit.

13. A center of gravity measurement system comprising:
 a center of mass calculator;
 at least three load cell units communicating with the center of mass calculator each comprising:
 (a) a base pad size for support against a generally horizontal surface;

(b) a jack supported on the base ad and extending upward there from by an adjustable height;

(c) a load cell supported on the jack and providing an upwardly exposed weighing surface to provide an electrical signal indicating a load placed on the weighing surface; and (d) a position identifier identifying a position of the load cell;

wherein the center of mass calculator receives electrical signals indicating a load from the at least three load cell units and a position of the load cells of the at least three load cell units to calculate a center of mass of a supported structure on the at least three load cell units;

wherein center of mass calculator outputs a total weight of the supported structure and its center of mass and monitors historical center of mass to detect load cell failure.

14. The center of gravity measurement system of claim 13 wherein the center of mass calculator extrapolates a load from a failed load cell failure by employing a previous center of mass determination and electrical signals indicating a load from the properly working cells.

15. A center of gravity measurement system comprising: a center of mass calculator; at least three load cell units communicating with the center of mass calculator each comprising:

(a) a base pad size for support against a generally horizontal surface;

(b) a jack supported on the base pad and extending upward there from by an adjustable height;

(c) a load cell supported on the jack and providing an upwardly exposed weighing surface to provide an electrical signal indicating a load placed on the weighing surface; and (d) a position identifier identifying a position of the load cell;

wherein the center of mass calculator receives electrical signals indicating a load from the at least three load cell units and a position of the load cells of the at least three load cell units to calculate a center of mass of a supported structure on the at least three load cell units; and wherein the position identifier is selected from the group consisting of: (i) an acoustic fiducial allowing acoustic identification of the position of each load cell and (ii) and optical fiducial allowing optical identification of the position of each load cell.

* * * * *